July 1, 1930. F. D. HOLDSWORTH 1,768,842
VALVE
Filed Jan. 16, 1917
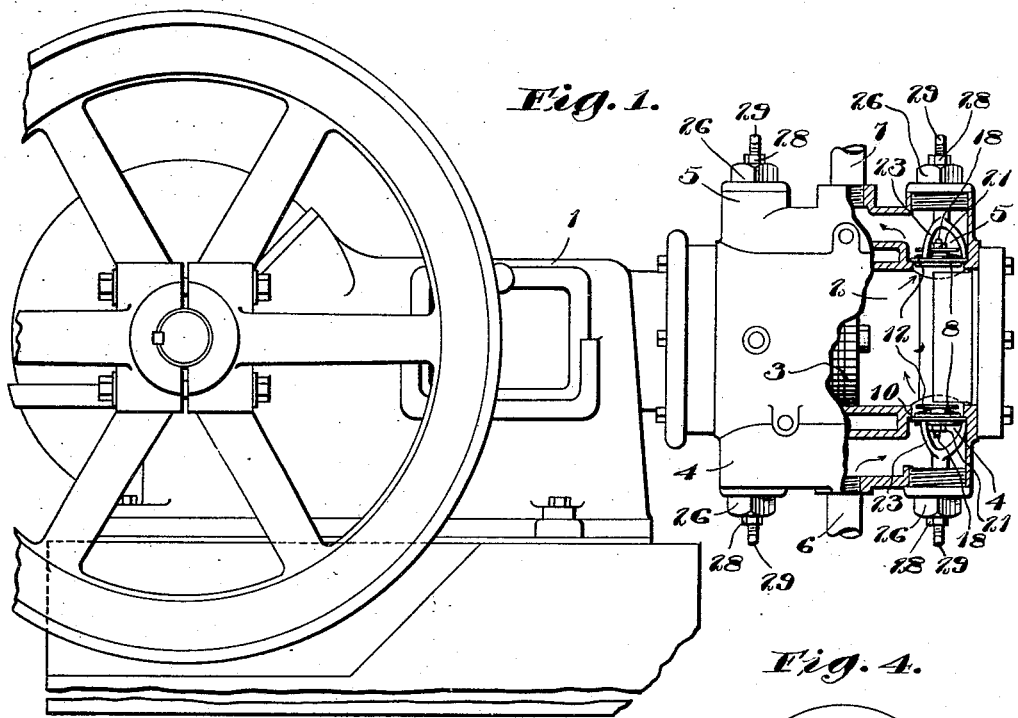
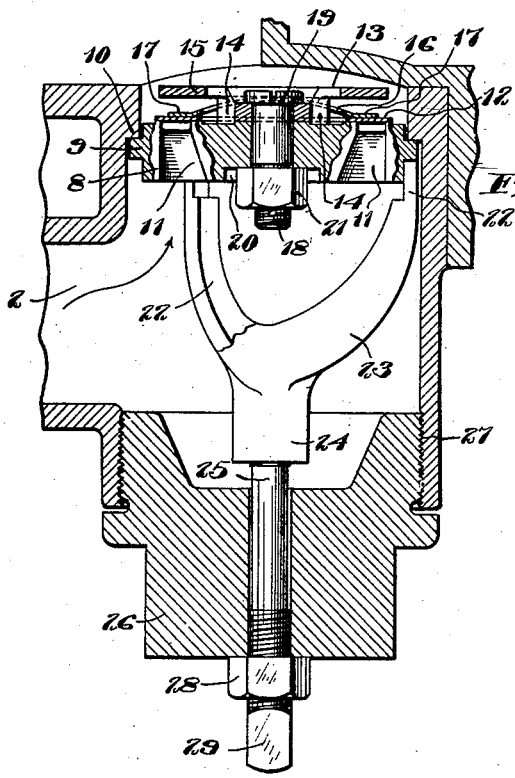
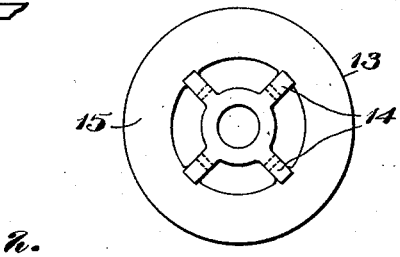
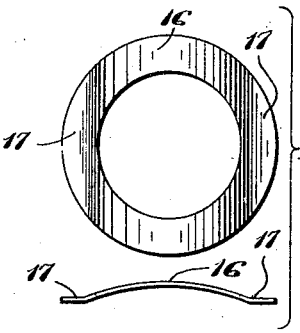
Inventor:
Fred D. Holdsworth
by
Atty.

Patented July 1, 1930

1,768,842

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE

Application filed January 16, 1917. Serial No. 142,706.

My invention relates to valves.

It has for its object to provide an improved valve. A further object of my invention is to provide a valve adapted to reduce to a minimum the necessary clearance space within the cylinder. A more specific object of my invention is to provide a valve of the plate type which is especially adapted to use in lieu of poppet valves in high speed compressors, and a valve of such a simple character that it may be manufactured more cheaply than poppet valves and used for a longer period without any evidences of wear or danger of breakage. These and other objects of my improvement will, however, hereinafter more fully appear.

In the accompany drawings, I have shown for purposes of illustration, one embodiment which my invention may assume in practice.

In these drawings,—

Fig. 1 is a side elevation of a compressor, partially in section, showing the same equipped with my improved valves.

Fig. 2 is a detail sectonal view of the cylinder casing showing the inlet valve in position therein.

Fig. 3 shows both a plan and side elevation of the valve spring.

Fig. 4 is a bottom plan view of my improved valve guard.

In the illustrative construction, I have shown a compressor 1, which may be of any desired type such as that now used with poppet valves, the same having a cylinder 2 and a piston 3 movable in the cylinder. As shown, the cylinder 2 is provided with inlet valves 4 and discharge valves 5 having a fundamental similarity to but constituting an improvement over the constructions described and claimed in my copending application Serial No. 81,727, filed March 2, 1916, these valves controlling the communication between the interior of the cylinder and the intake 6 and discharge pipe 7, respectively.

In describing my improvement, I shall refer to the inlet valve only, it being understood that the discharge valve is of substantially identical construction. As illustrated in Fig. 2, it will be noted that I have provided a valve seat 8 having a lateral flange 9 thereon, preferably though not necessarily, substantially midway between its ends and adapted to rest on a correspondingly flanged portion 10, preferably formed on the cylinder casing. In this member 8 one or more ports 11, preferably arcuate in shape, are provided, and over these ports is disposed an annular valve member 12, preferably formed of rigid sheet steel, having its outer and inner peripheries resting on the member 8. Disposed over this valve member 12 and suitably clamped to the member 8, is a guard 13 having annularly disposed guiding portions, herein shown to be formed on radially disposed wings 14, adapted to engage the inner periphery of the valve 12 and guide the latter as the same is lifted by the action of the pressure fluid passing through the ports 11. As shown, this member 13 is also provided with an upper laterally extending preferably annular flange 15 adapted to engage with a transversely flexed annular valve spring 16, preferably formed of thin resilient sheet metal, and preferably having slightly bent up or flattened ends 17 to reduce wear, the ends being engageable as desired, either with the under surface of the flange 15 while the bowed portion of the spring engages the upper surface of the valve 12, or, as shown, with the upper surface of the valve 12 while the bowed portion of the spring engages the under surface of the flange 15. Obviously, the guiding portions or wings 14 on the member 13 will also act as guides for this spring 16.

In a preferred embodiment of my invention, the member 13 is rigidly clamped to the member 8 by means of a reversible bolt 18 having its head 19 countersunk in the inner surface of the member 13 and its threaded end extending outwardly through a countersink 20 in the member 13, a nut 21 being carried on the threaded end of the bolt and seated in the countersink 20 when the parts are clamped together. As shown, the flange 9 on the member 8 is also engaged at a plurality of points by the reduced ends 22 of a forked member 23 having its body 24 engageable by a screw or bolt 25, which is in turn adjustable through a plug 26 threaded in the cylinder casing, as at 27, the bolt 25 being held in position by any suitable means, as by a nut 28, and preferably also having a flattened portion 29 whereby the same may be readily turned.

In the use of my improved construction, it will be obvious that as the air is drawn into the cylinder 2, the same will cause the valve member 12 to be lifted bodily from its position over the ports 11. Thus, as the valve 12 moves the spring 16 will be flattened out, both the valve and the spring being guided in their movement by the wings 14. Obviously, when the pressure has reached its maximum the two members 12 and 16 will rest substantially flat against the under surface of the flange 15, and when this occurs the entire port area will be available and the air may pass out through the ports without obstruction. Conversely, when the pressure falls, the spring 16 will tend to return to its normal conformation illustrated in Fig. 3, thus depressing the comparatively rigid valve 12 and causing the latter to assume its closed position wherein it is firmly held over the ports 11 in such a manner as to prevent effectually any escape of air through those ports. During this movement, it will also be evident that the wings 14 will continue to act as guides for both the spring and the valve.

In connection with my improved construction, it will be noted that the seat, guard, valve and spring form a single compact and readily removable unit, readily adapted to use as either an inlet or discharge valve by simply reversing the bolt 18. In the use of the valve as an inlet valve, it will also be noted that, due to the compactness of the construction, the necessary clearance space is reduced to the minimum; while, when the bolt is reversed and the valve is used as a discharge valve, the discharge valve seat may be lowered in such a manner as also to minimize the clearance space on the discharge side. It will also be noted that it is possible to produce both the valve and the spring by stamping the same from sheet metal, the spring only requiring shaping in such a manner as to give it the desired resiliency. It will also be evident that through the use of the improved guard shown herein, the parts may be very readily assembled and taken apart when desired. In operation, the moving parts are also efficiently guided in their movement in such a manner as effectually to prevent any sticking of the valve, the centrally located guiding surfaces on the guard cooperating with the spring in eliminating any such tendency. By the use of the improved seat shown herein, it will be noted that the latter is made interchangeable so that it may be used if desired in an inlet valve, the bolt then, of course, being reversed as shown in Fig. 1. At the same time it will be noted that the seat, when used in either a discharge or inlet valve, may cooperate with the forked member and be positively clamped in position without the necessity for providing means which interrupt or obstruct the free flow of pressure fluid when the valve is open. It will further be noted that the cooperation of the spring with the valve will operate to effect smooth and proper movement of the valve, tendency towards tilting being minimized and the closing forces being transmitted in a balanced manner to the valve. The contacts between the valve and spring, when the valve is partially open, are truly linear and so located that the force is transmitted to the valve along chordal lines at opposite sides of its center, these lines approaching each other as the valve closes and moving apart as the valve opens and flattens the spring. It will be noted that when closed the spring has contact with the valve at widely spaced points at one side of its line of contact with the guard and at the other side of the valve engages the latter at a point in an axial plane perpendicular to the line of contact with the guard as well as at points on each side of that point. These and other objects of my improved construction will, however, be clearly apparent to those skilled in the art.

While I have in this application specifically described one embodiment which my invention may assume in practice, it is of course to be understood that the invention may be modified and embodied in various other forms without departing from its spirit, it being my intention to include all such modifications within the scope of the appended claims.

What I claim as new and desire to secure by Letters Patent is:—

1. In a valve, a ported valve seat, an annular valve disposed over the ports therein and imperforate between its inner and outer peripheries, a guard, and an annular transversely flexed spring having a flat guiding portion and disposed between said guard and valve.

2. In a valve, a ported valve seat, an annular valve disposed over the ports therein and imperforate between its inner and outer peripheries, a guard having a guiding means, and an annular transversely flexed spring having flattened ends and disposed between said guard and valve.

3. In a valve, a ported valve seat, an annular valve disposed over the ports therein and imperforate between its inner and outer peripheries, a guard, and an annular transversely flexed spring having flattened ends and disposed between said guard and valve.

4. In a valve, a ported valve seat, an annular valve disposed over the ports therein and imperforate between its inner and outer peripheries, a guard having a guiding portion, and a sheet metal spring member having unbroken inner and outer circumferences which are without reentrant curves and are materially spaced throughout their entire extents, said spring being flattenable on compression so that all the portions thereof may lie in substantially the same planes, and said spring having a flat guiding portion and being disposed between said guard and said valve.

5. In a valve, a ported valve seat, an annular valve disposed over the ports therein and imperforate between its inner and outer peripheries, a guard carried by said seat and having a laterally extending flange portion and an inner guiding portion, and a transversely flexed annular spring disposed between said flange and said valve and having flattened edges engageable with one of said members.

6. In a valve, a ported valve seat, an annular valve disposed over the ports therein and imperforate between its inner and outer peripheries, a guard, and an annular spring having a valve guiding portion chordally disposed at a point offset from the center of the valve and disposed between said guard and valve.

7. In a valve, a ported valve seat, an annular valve disposed over the ports therein and imperforate between its inner and outer peripheries, a guard, and an annular spring having a valve guiding portion slidable radially in a direction perpendicular to the major dimension thereof on opening of the valve and disposed between said guard and valve.

8. In a valve, a ported valve seat, an annular valve disposed over the ports therein and imperforate between its inner and outer peripheries, a guard and an annular spring having spaced parallel valve guiding portions and disposed between said guard and valve.

9. In a valve, a ported valve seat, an annular valve disposed over the ports therein and imperforate between its inner and outer peripheries, a guard, and an annular spring having valve guiding portions parallel and at opposite sides of the center of the annulus and disposed between the guard and valve.

10. In a valve, a ported valve seat, an annular valve disposed over the ports therein and imperforate between its inner and outer peripheries, a guard having a guiding portion, and an annular transversely flexed spring having a valve engaging surface engaging with the valve with surface contact which includes a transverse line parallel to but offset from a diametric line and disposed between said guard and said valve.

11. In a valve, a ported valve seat, an annular valve disposed over the ports therein and imperforate between its inner and outer peripheries, a guard carried by said seat and having an outer annular flange portion and an inner guiding portion and an annular spring in the form of a closed ring and having when said valve is closed a transversely extending substantially plane valve engaging surface and disposed between said flange and said valve.

12. In a valve, a ported valve seat, an annular valve disposed over the ports therein, a guard carried by said seat, annularly disposed guiding means disposed between said guard and seat, and a transversely bowed annular spring disposed between said guard and valve having a plurality of valve engaging portions not in the same straight line, every element of the surface of said spring being parallel to a single straight line.

13. In a valve, a ported valve seat, an annular valve disposed over the ports therein, a guard carried by said seat, annularly disposed guiding means disposed between said guard and said seat, and a transversely flexed annular spring disposed between said guard and valve and having a plurality of valve engaging surfaces whose most adjacent elements are parallel and on opposite sides of the axis of the valve.

14. In a valve, a ported valve seat member, an annular valve disposed over the ports therein, a guard member carried by said seat, annularly disposed guiding means formed on one of said members, and a transversely flexed annular spring disposed between said members and engaging said valve at two spaced places only and those at opposite sides of a diametric line, said spring having engagement with the guard whereby it acts to prevent tilting of said valve about a line parallel to a straight line passing through both of said places of contact.

15. In a valve, a valve seat, a ring valve member thereon, a guard, and a transversely flexible annular spring imperforate between its inner and outer peripheries and so bowed that all the elements thereof are parallel to a single straight line and arranged between said valve member and guard with the concave side of the spring facing the valve member.

16. In a valve, a ported valve seat, an annular valve disposed over said ports and imperforate between its inner and outer peripheries, a guard, and an annular transversely flexed spring all the elements of whose surface are parallel to a single straight line, said spring being disposed between said valve and guard and having contact with said valve at loci at opposite sides of the central element of said spring surface.

17. In a valve, a ported valve seat, an annular valve disposed over said ports, a guard, and an annular transversely flexed spring all the elements of whose surface are parallel to a single straight line, said spring being imperforate between its inner and outer peripheries and being disposed between said valve and guard and having contact with said valve at at least three points not in a straight line.

18. In a valve, a ported valve seat, an annular valve disposed over said ports, a guard, and an annular transversely flexed spring imperforate between its inner and outer peripheries and disposed between said valve and guard and having contacts with the former which move apart in a direction perpendicular to their greatest dimension on opening of the valve.

19. In a valve mechanism, a seat having a plurality of annularly arranged ports therein, an annular cover, an annular valve disposed between said seat and cover and adapted to close the ports in the former and imperforate between its inner and outer peripheries, and resilient spring means for effecting closing of said valve having free ends and a flexed portion intermediate said ends, said spring means having a substantially circular outer periphery when flattened and said spring means having when said valve is closed a line contact with the cover and being flexible against said cover to bring said ends and said intermediate portion substantially into a single plane.

20. In a valve mechanism, a seat providing an annularly arranged series of ports, a cover, an annular valve disposed between said seat and cover and adapted to close the ports in the former and imperforate between its inner and outer peripheries, and resilient spring means of the same general dimensions as said valve for effecting closing of the latter having free ends and a flexed portion intermediate said ends, said spring means having when said valve is closed radial line contact with the cover and being flexible against said cover to bring said ends and said intermediate portion substantially into a single plane.

21. In a valve mechanism, a ported valve seat, an annular valve disposed over the ports thereof, a guard, an intermediate guiding portion, and an annular transversely flexed spring imperforate between its inner and outer peripheries and disposed between said guard and valve and having parallel line contacts with said valve and with said guard when said valve is unseated less than its full amount.

22. In a valve, a valve seat, a single annular series of ports therein, a guard having a plane surface opposed to said valve seat, a valve circular in periphery disposed over said ports, and a spring transversely flexed and of the same contour as said valve, said spring having a line contact with said guard and having at all times with said valve chordally extending contacts which extend in substantially the same direction as said line contact and move relative to said valve upon opening of said valve towards tangents to said circle drawn parallel to the line of contact between the valve and guard.

23. In a valve, a ported valve seat, an annular valve disposed over the ports therein and imperforate between its inner and outer peripheries, a guard, and a sheet metal spring member having unbroken inner and outer circumferences which are without reentrant curves and which are materially spaced throughout their entire extents, said spring being flattenable on compression so that all the portions thereof may lie in substantially the same planes and said spring having engagement with said guard and valve and having a valve guiding portion slidably engaging the valve and constantly having with said valve in all positions of the latter at least a line of contact.

24. In a valve, a ported valve seat, an annular valve disposed over the ports therein, an annular transversely flexed spring every element of whose surface is parallel to every other element thereof and which has a guiding portion engaging said valve, said guiding portion having at least a linear contact with said valve of substantial length, which contact extends substantially parallel to but is substantially spaced laterally from a diametric line, and a guard having an annularly disposed guiding portion engaging one of the peripheries of said valve and spring, said spring engaging said guard along a line extending in like direction with said diametric line.

25. In a valve, a ported valve seat, an annular valve member cooperating therewith, a guard member, a valve guide, and an annular valve spring disposed between said valve and guard members and transversely flexed, said spring imperforate between its inner and outer peripheries and engaging one of said members along a line extending substantially diametrically with respect to said valve seat and relatively slidably engaging the other of said members at opposite sides of said line, at least one of said last mentioned engagements including in all positions of the valve at least two points of contact which are materially spaced in a direction similar to that in which said line extends.

26. In a valve, a ported valve seat, an annular valve disposed thereon, valve guarding and guiding means including a flange in fixed relation to said seat and a guide at an angle to said flange, and a transversely flexed annular spring imperforate between its inner and outer peripheries and having all the elements of its flexed surface parallel and having a transverse valve engaging portion engaging the valve at a locus offset from a diametric line and parallel to said parallel elements, and disposed between said flange and valve, the contact between said valve and spring at said locus extending substantially to the opposite sides of a diametric line at right angles to said first mentioned diametric line.

27. In a valve, a valve seat, an annular series of ports therein, a guard having a plane surface opposed to said valve seat, a valve circular in periphery disposed over said ports, and a spring transversely flexed and of the same contour as said valve, said valve and spring each being imperforate between its inner and outer peripheries and said spring having a line contact with said guard and contacting with said valve in relatively slidable engagement along at least two straight lines extending in like direction with said line contact and of substantial length in all positions of the valve whether it be open or closed.

28. In a valve, a valve seat, a single annular series of ports therein, a guard having a plane surface opposed to said valve seat, a valve circular in periphery disposed over said ports, and a spring transversely flexed and of the same contour as said valve, said spring having a line contact with said guard which remains motionless during opening of said valve and said spring contacting with said valve in relatively slidable engagement along at least two straight lines extending in like direction with said line contact and of substantial length in all positions of the valve whether it be open or closed.

29. In a valve, a ported valve seat, an annular valve disposed over the ports therein, a guard, a guiding portion disposed between said guard and seat, and an annular transversely flexed spring every element of whose curved surface is parallel to every other element thereof and having at least two lines of contact with said valve parallel to and on opposite sides of the central element of said curved surface, said spring being disposed between said guard and said valve, and being imperforate between its inner and outer peripheries.

30. In a valve, a ported valve seat, an annular valve disposed over the ports thereof, a guard, a guide portion disposed between said guard and seat, and an annular transversely flexed spring with respect to which said valve is relatively rotatable and which has in all positions of said valve relative to its seat contact with said valve and guard along at least parallel lines of substantial length, said spring being imperforate between its inner and outer peripheries.

31. In a valve, a ported valve seat, an annular valve disposed over the ports thereof, a guard, a guide portion disposed between said guard and seat, and an annular transversely flexed spring imperforate between its inner and outer peripheries and slidably engaging said valve and having at all times at least three parallel lines of contact of appreciable length with said valve and with said guard whereby said valve and guard may be subjected to the pressure of said spring at points on opposite sides of a plane perpendicular to said valve seat and to which said lines are perpendicular.

32. In a valve, a ported valve seat, an annular valve disposed over the ports therein and imperforate between its inner and outer peripheries, a guard, and an annular transversely flexed spring loosely disposed between the valve and guard and having at all times contacts with said valve along at least two mutually laterally offset similarly directed straight lines whose length is at least as great when said valve is open as when said valve is closed.

33. In a valve mechanism, a ported valve seat, annular valve means disposed over the ports therein and imperforate between its inner and outer peripheries, a guard rigidly mounted in spaced relation to said seat, a spring superimposed on said valve means and of substantially the same internal diameter as the latter, said spring being of substantially the same radial dimension throughout its circumference and not exceeding 360° in circular measure and said spring having a contact with said valve means of substantial length in all positions of the latter and which is movable radially on valve movement, and common guiding means for said spring and valve means.

34. In a valve mechanism, a ported valve seat, annular valve means disposed over the ports therein and imperforate between its inner and outer peripheries, a guard rigidly mounted in spaced relation to said seat, and a spring superimposed on said valve means and of substantially the same internal diameter as the latter, said spring having a portion having contact with said valve, when the latter is closed, of substantial length and which moves in the plane of the valve surface transversely to its length on opening of said valve.

35. In a valve mechanism, a ported valve seat, annular valve means disposed over the ports therein, a guard rigidly mounted in spaced relation to said seat, and a spring superimposed on said valve means and of substantially the same internal diameter as the latter and flexible on opening of said valve, said spring having a portion in constant contact with said valve means during opening and closing of the latter and in all positions of said valve having an engagement of substantial length with the surface thereof.

36. As an article of manufacture, a valve spring of resilient sheet metal having substantially circular internal and external peripheries and having portions respectively adapted to make contact with a valve element and with an element concentric with but spaced from such valve element, said spring having the portion thereof between said contact-making portions freely flexible into parallelism with a plane and imperforate between said internal and external peripheries, and said spring being so bent that there is relative movement of said contacts on compression of said spring tending to bring all parts of the latter into a single plane, each of said contacts being of substantial length in a direction at right angles to their direction of relative movement.

37. As an article of manufacture, a valve spring of resilient sheet metal substantially circular in internal and external outline, said spring being imperforate between its internal and external peripheries and being bowed so that all the elements of the bowed surface are substantially parallel and having approximately diametrically oppositely spaced portions adapted to make contact with a valve, at least one of said contacts being of substantial extent in a direction parallel to said elements and the deformation of said spring being such that said contact remains a contact of substantial extent in such direction throughout compression and release of said spring in use and that relative movement takes place between said oppositely spaced portions on opening and closing of said valve.

In testimony whereof I affix my signature.

FRED D. HOLDSWORTH.

CERTIFICATE OF CORRECTION.

Patent No. 1,768,842. Granted July 1, 1930, to

FRED D. HOLDSWORTH.

It is hereby certified that error appears in the printed specification of the above numbered patent requiring correction as follows: Page 1, line 17, for the word "accompany" read accompanying; page 3, line 36, claim 8, after "guard" insert a comma; page 4, line 100, claim 25, after "spring" insert the word being; page 5, line 37, claim 29, strike out the comma; same page, line 107, claim 35, after the word "therein" insert the words "and imperforate between its inner and outer peripheries"; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.